Figure 1:
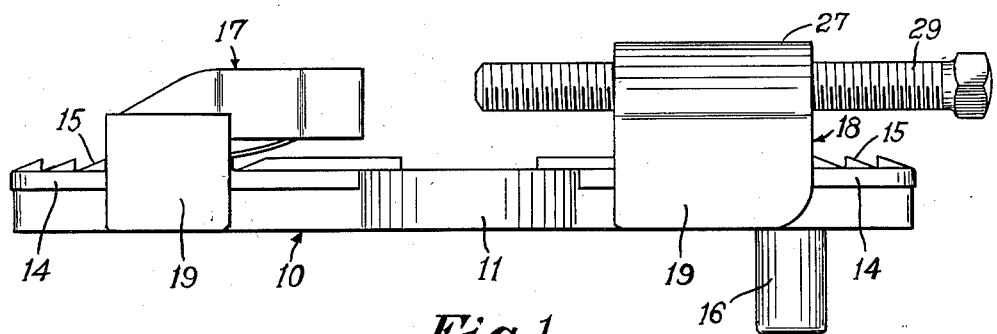

March 6, 1951  L. ROYER  2,543,990

COMBINATION LATHE DOG AND VISE

Filed Jan. 6, 1948

INVENTOR.
Leroy Royer
BY
ATTORNEYS

Patented Mar. 6, 1951

2,543,990

UNITED STATES PATENT OFFICE 2,543,990

COMBINATION LATHE DOG AND VISE

Leroy Royer, Louisville, Ohio, assignor, by mesne assignments, to Donald F. Arbuckle, Canton, Ohio Application January 6, 1948, Serial No. 780

3 Claims. (Cl. 82—41)

The invention relates to lathe dogs, and more particularly to a dog which may be easily and readily converted into a bench vise without making any change in the construction of the dog.

It is an object of the invention to provide a dog of the type used upon lathes, comprising means for clamping the piece to be turned and means for engaging the face plate of the lathe head for imparting the rotary movement thereof to the piece.

Another object is to provide such a device having a pair of independently adjustable clamping jaws thereon, one of said jaws being provided with a clamping screw for contact with the piece to be turned.

A further object is to provide a lathe dog of this character comprising a bar having a central enlargement in the form of an annulus for receiving the lathe center, and provided with rack teeth at opposite ends, and a pair of clamping jaws longitudinally, adjustable thereon, each jaw having a tooth for selective engagement with the corresponding rack teeth, and spring means for holding said teeth in engagement.

A still further object is to provide a lathe dog of the type referred to in which one of said movable jaws is recessed and toothed for engaging one side of the piece to be turned, and the other jaw is provided with a clamping screw for clamping the piece in said toothed recess.

Another object is to provide a box adapted to receive the lathe dog so as to convert the same into a vise, the box having an aperture to receive the lug provided upon the lathe dog for engaging the usual notch in the periphery of the face plate of the lathe, as in usual practice.

A further object is to provide such a box, for the reception of the lathe dog, with a central opening arranged to register with the annulus of the lathe dog to receive the work clamped in the lathe dog.

Figure 2:
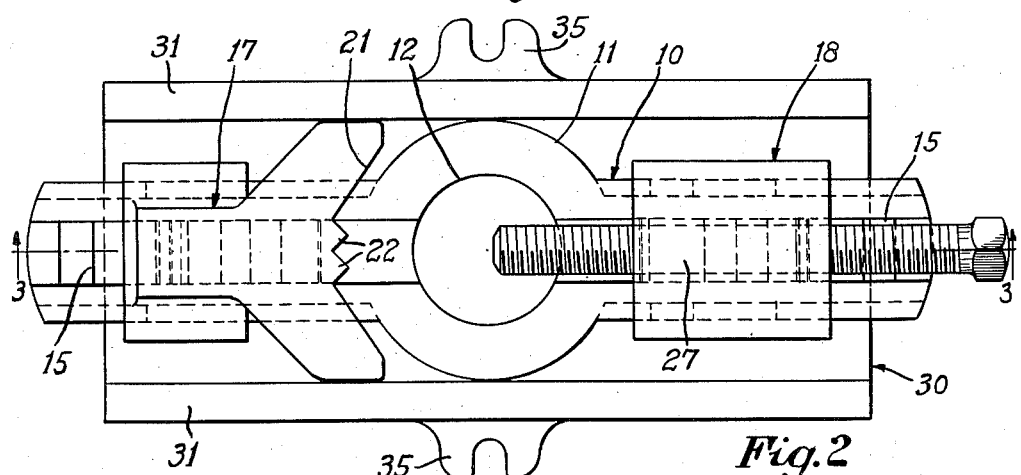
Figure 3:
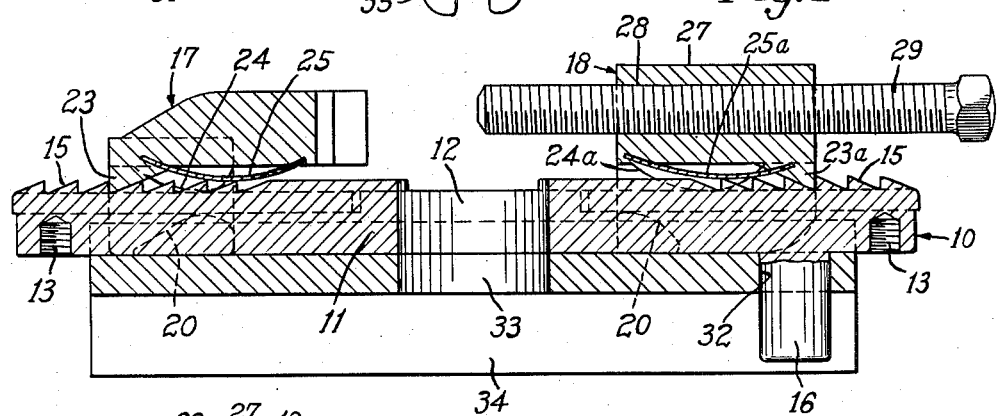

The above objects together with others which will be apparent from the drawing and following description, or which may be later referred to, may be attained by constructing the improved lathe dog and vise in the manner hereinafter described in detail and illustrated in the accompanying drawing, in which;

Figure 1 is a side elevation of a lathe dog embodying the invention;

Fig. 2 a plan view of the lathe dog mounted in the box which converts it into a vise;

Fig. 3 a longitudinal section taken as on the line 3—3, Fig. 2; and

Figure 4:
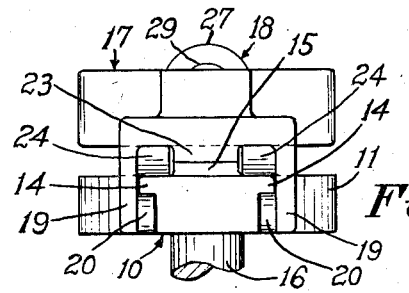

Fig. 4 an end view of the lathe dog.

Referring now more particularly to the embodiment of the invention as illustrated in the accompanying drawing, the improved lathe dog comprises a bar, indicated generally at 10, having the annulus 11 at its center, provided with the central opening 12 of sufficient diameter to receive the lathe center, as in usual and well known practice.

The bar 10 is preferably of rectangular cross sectional shape, having the longitudinal portions on each side of the annulus 11, spaced inwardly from the side edges of the bar so as to provide the overhanging side flanges 14 thereon, forming guideways for the adjustably mounted jaws which will be later described. The ends of the bar are drilled and tapped, as shown at 13, to permit the dog to be used as a face plate clamp.

Oppositely disposed ratchet teeth 15 are formed on the top of the bar 10 on opposite sides of the central annulus. The usual lug 16 is formed near one end of the bar for the purpose of engaging the usual peripheral slot in the face plate of the lathe in order to impart rotary movement to the piece being turned, as in conventional practice.

The jaw, indicated generally at 17, is adjustably mounted upon one of the rack bar portions thus formed on the bar and the jaw indicated generally at 18 is similarly mounted upon the other end thereof. Each of these jaws has depending flanges 19, with inwardly disposed rockers 20 near their lower edges engaging under the guide flanges 14 of the bar, whereby the jaw may be slidably moved toward or from the center of the bar.

The jaw 17 has the work receiving recess 21 with teeth 22 therein for engaging and gripping the work. A depending angular tooth 23 is formed upon the under side of the jaw 17 for selective engagement with the rack teeth 15 upon that end of the bar, and rockers 24 depend from the jaw 17 and contact the top of the bar on each side of the teeth 15, an arcuate spring 25 being mounted on the under side of the jaw 17 for contact with the top of the bar to normally hold the tooth 23 thereof in engagement with one of the teeth 15, but permitting the jaw to be rocked upon the rockers 24 so as to disengage the tooth 23 from the rack teeth 15 and permit sliding movement of the jaw 17 upon the bar.

The jaw 18 has a tooth 23a, similar to the tooth 23, for selectively engaging the rack teeth 15, and is provided with the depending rockers 24a for contact with the upper surface of the bar on each side of the rack teeth, and a spring 25a for normally holding the tooth 23a in contact with the rack teeth, but permitting the jaw 18 to be rocked upon the rockers 24a to disengage the teeth to permit longitudinal movement of the jaw 18 upon the bar.

A rounded boss 27 is formed upon the jaw 18 and provided with the longitudinal tapped bore 28, within which is located a clamping screw 29 by means of which the work piece may be clamped in the recess 21 of the jaw 17.

For the purpose of converting the improved lathe dog into a vise, the box, indicated generally at 30, is provided, having the upstanding, longitudinal flanges 31 at each side so as to receive the lathe dog therein, an aperture 32 being formed in one end portion of the box to receive the lug 16 of the lathe dog to hold the same against movement in the box, and a central aperture 33 being provided in the box to register with the central aperture 12 of the annulus of the lathe dog to receive the work. If desired, depending flanges 34 may be provided at the sides of the box for supporting the same upon a table or bench.

Slotted lugs or ears 35 may be formed on each side of the box, at the center and bottom thereof, as shown in Fig. 2, for receiving bolts or screws for clamping the box to a drill press table, work bench or the like.

I claim:

1. A lathe dog comprising a bar having an annulus at its center, rack teeth upon opposite end portions of the bar, a pair of work holding jaws slidably mounted upon opposite end portions of the bar, a tooth upon each jaw for engagement with the respective rack teeth on the bar, a spring in each jaw for normally holding said tooth thereon in engagement with the rack teeth, rockers on each jaw engaging the bar for rocking the tooth out of engagement with the rack teeth, and an angular lug near one end of the bar.

2. A lathe dog comprising a bar having an annulus at its center, rack teeth upon opposite end portions of the bar, a pair of work holding jaws slidably mounted upon opposite end portions of the bar, one of said jaws having a work receiving recess, a clamping screw in the other jaw, a tooth upon each jaw for engagement with the respective rack teeth on the bar, means in each jaw for normally holding said tooth thereon in engagement with the rack teeth rockers on each jaw engaging the bar for rocking the tooth out of engagement with the rack teeth, and an angular lug near one end of the bar.

3. A lathe dog comprising a bar having an annulus at its center, rack teeth upon opposite end portions of the bar, a pair of work holding jaws slidably mounted upon opposite end portions of the bar, one of said jaws having a work receiving recess, a clamping screw in the other jaw, a tooth upon each jaw for engagement with the respective rack teeth on the bar, a spring in each jaw for normally holding said tooth thereon in engagement with the rack teeth, rockers on each jaw engaging the bar for rocking the tooth out of engagement with the rack teeth, and an angular lug near one end of the bar.

LEROY ROYER.

REFERENCES CITED

The following references are of record in the file of this patent:

UNITED STATES PATENTS

| Number | Name | Date |
| --- | --- | --- |
| 381,890 | Taylor | Apr. 24, 1888 |
| 438,826 | Randall | Oct. 21, 1890 |
| 1,032,705 | Ross | July 16, 1912 |
| 1,514,160 | Johnson | Nov. 4, 1924 |
| 1,801,648 | Swanson | Apr. 21, 1931 |